United States Patent [19]
Prud'Homme

[11] Patent Number: 5,325,948
[45] Date of Patent: * Jul. 5, 1994

[54] CLUTCH WITH STRUCTURAL PLATES, ESPECIALLY OF CARBON-CARBON

[75] Inventor: Guy Prud'Homme, Ste Foy Les Lyon, France

[73] Assignee: Carbone Industrie, Bagnolet Cedex, France

[*] Notice: The portion of the term of this patent subsequent to Feb. 8, 2011 has been disclaimed.

[21] Appl. No.: 956,311

[22] Filed: Oct. 5, 1992

[30] Foreign Application Priority Data

Oct. 9, 1991 [FR] France ............... 91 12431

[51] Int. Cl.⁵ .............................................. F16D 13/40
[52] U.S. Cl. ............................... 192/70.14; 192/70.19; 192/70.28
[58] Field of Search ............... 192/70.11, 70.14, 70.16, 192/70.19, 70.21, 70.28, 109 A, 109 B

[56] References Cited

U.S. PATENT DOCUMENTS

| | | | |
|---|---|---|---|
| 2,036,005 | 3/1936 | Wemp | 192/70.21 |
| 2,600,520 | 6/1952 | Spase | 192/70.21 |
| 4,466,524 | 8/1984 | Lane | |
| 4,676,356 | 6/1987 | Beccaris et al. | 192/70.28 |
| 5,123,510 | 6/1992 | Beccaris et al. | 192/70.19 X |
| 5,137,131 | 8/1992 | Enomoto | 192/70.14 |

FOREIGN PATENT DOCUMENTS 8533270 4/1987 Fed. Rep. of Germany .
2623862 6/1989 France .

Primary Examiner—Richard M. Lorence
Attorney, Agent, or Firm—Sughrue, Mion, Zinn, Macpeak & Seas

[57] ABSTRACT

The present invention concerns a clutch with structural friction plates, especially of carbon-carbon, comprising a drive flywheel, a first driving plate forming a first non-clutching interface with the flywheel, at least one pair of driven plates connected to an output shaft, and a driving plate being interposed between each pair of driven plates. A second driving plate and a thrust plate form a second non-clutching interface with the second driving plate. A casing has a mechanism operable to apply pressure to the thrust plate and is provided with bars fitted into radial recesses of the driving plates and being fixed to the flywheel. A packing-up device eliminates the play at at least one of the non-clutching interfaces and the device presses the driving plate against the adjacent part.

5 Claims, 11 Drawing Sheets

CLUTCH WITH STRUCTURAL PLATES, ESPECIALLY OF CARBON-CARBON

The present invention relates to a clutch with structural friction plates, especially of carbon-carbon, comprising:
- a flywheel,
- a first driving plate forming a first non-clutching interface with the flywheel,
- at least one on driven plate connected to an output shaft, a driving plate being interposed between each pair of driven plates,
- a second driving plate,
- a thrust plate forming a second non-clutching interface with the second driving plate,
- a casing comprising a mechanism operable to apply pressure to the thrust plate and provided with bars fitted into radial recesses of the driving plates and fixed to the flywheel.

BACKGROUND OF THE INVENTION

Carbon-carbon friction clutches of this type, used mainly at present in competition vehicles, have many advantages over conventional clutches, in particular very high resistance to large stresses, low wear under high stress and reduced mass and inertia.

However, these clutches are subject to the problem that the clutch comes free less well than conventional clutches with organic linings.

Thus, two supplementary structural driving plates, on the flywheel side and the thrust plate side, are needed in such clutches since the friction only acts at the carbon-carbon interfaces. As a result there are two additional regions of play in the disengaged position.

Considering the example of a conventional single plate clutch, the friction interfaces are cast iron-to-organic material and the play is distributed between the flywheel/driven plate interface and the driven plate/thrust plate interface.

In the case of clutch with structural plates and called a "single-plate" clutch by analogy, the play is distributed over four interfaces, namely the flywheel/first driving plate non-clutching interface, the first driving plate/driven plate clutching interface, the driven plate/second driving plate interface and the second driving plate/thrust plate interface.

With the same total play only half as much play results at the two friction clutching interfaces and, as a result, there is additional wear and residual friction leading to unsatisfactory disengagement.

The object of the invention is to provide a structural plate clutch which, apart from the inherent value of these plates, especially carbon-carbon plates, namely being made in one piece, and their inherent properties which are considerably superior to those of conventional plates, has means referred to as packing-up which are reliable and simple, while comprising a limited number of components, which enable the play to be better distributed.

SUMMARY OF THE INVENTION

To achieve this in accordance with the invention, the clutch comprises a packing-up device eliminating the play at at least one of the non-clutching interfaces and comprising means pressing the driving plate against the adjacent part.

Accordingly, in the disengaged position, the play is distributed uniformly over the active interfaces of the driving plates and the driven plates, where it is larger than in the known clutches. The amount of the plays is larger or smaller depending on whether the play is eliminated at the two non-clutching interfaces or only at one of these two non-clutching interfaces.

In a first embodiment, the packing-up device comprises at least one resilient metal tongue located between the driving plate of the interface and the next adjacent driving plate, and of which the operative curved end presses the plate of the non-clutching interface against the adjacent part.

In one variant the packing-up device comprises two tongues located against the side faces of the bar.

To facilitate assembly, the two resilient tongues may be connected by a central strip located against the inner face of the bar.

In another variant, the bars are U-shaped in plan configuration with an opening on the side of the part of the interface, the driving plate having two recesses receiving the limbs of the bar and the tongue being located in the opening and pressing against the driving plate between the recesses.

To fix the tongue, it may be extended by a tongue part located against the outer face of the bar and provided with a hole receiving the means attaching the casing to the flywheel.

BRIEF DESCRIPTION OF THE DRAWINGS

Embodiments of the invention are described by way of example with reference to the accompanying drawings, in which.

DETAILED DESCRIPTION

Figure 1:
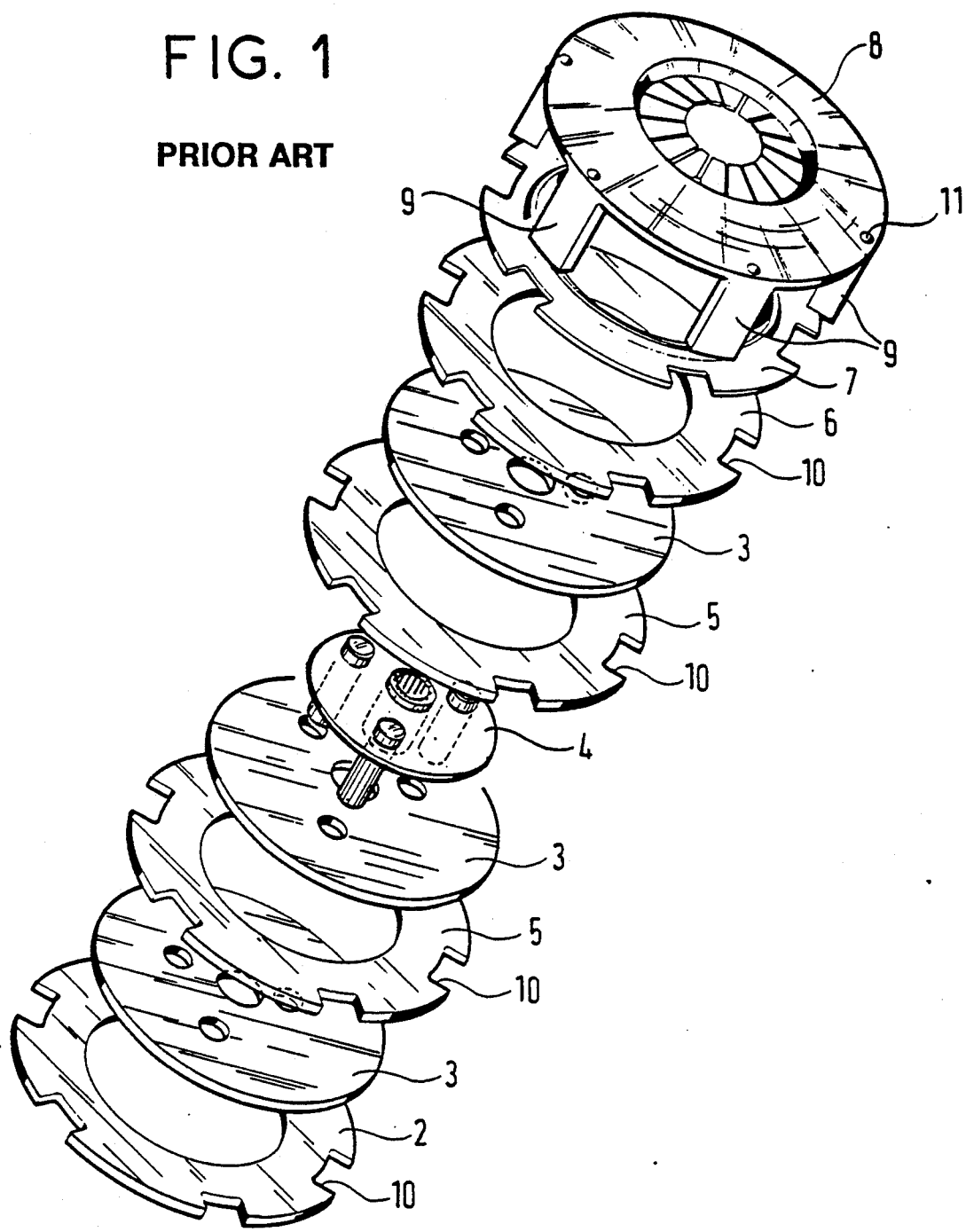
FIG. 1 is a partial exploded view in perspective of a prior art multi-plate clutch with structural plates.

FIG. 1 shows some parts of a known clutch called a "three-plate clutch" (by analogy with conventional clutches with organic linings). On the drive flywheel, which is not shown but which is located in the lower part of the figure, there are fitted a driving plate 2, called the "first" driving plate, three driven plates 3 connected to an output shaft by a hub 4, a driving plate 5 interposed between each pair of driven plates 3, a driving plate 6 called the "second" driving plate, a thrust plate 7 and a casing 8 with a mechanism operable to apply pressure to the thrust plate 7 and provided with bars 9 fitted into radial recesses 10 of the driving plates 2, 5, 6 and fixed to the flywheel by screws fitted in holes 11 in each bar 9 and screwed into the flywheel. The bars 9 may be part of the casing 8 or may be fixed thereto by screws or otherwise.

Figure 2:
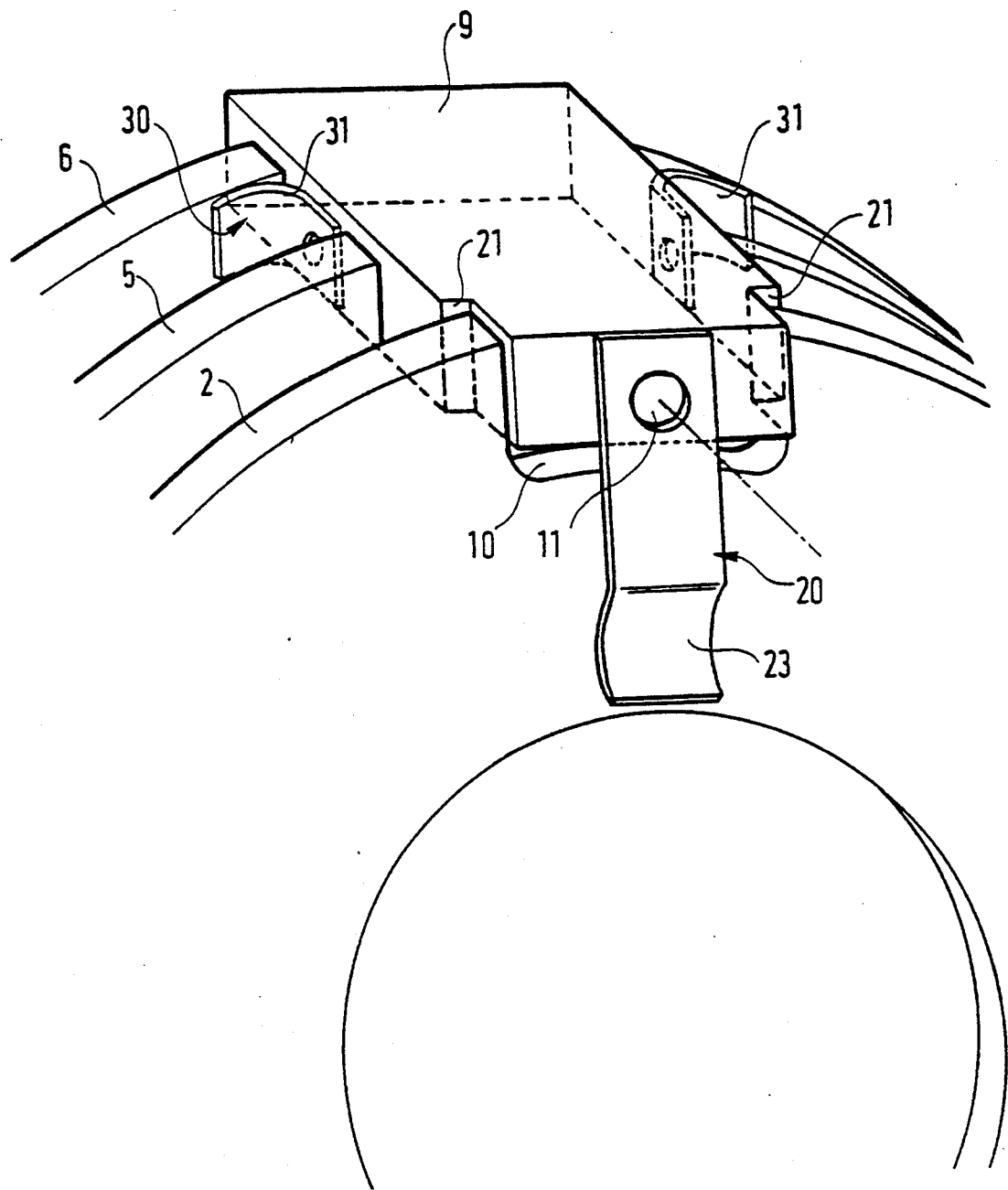
FIG. 2 is a partial perspective view of a first embodiment of a clutch in accordance with the invention.
Figure 3:
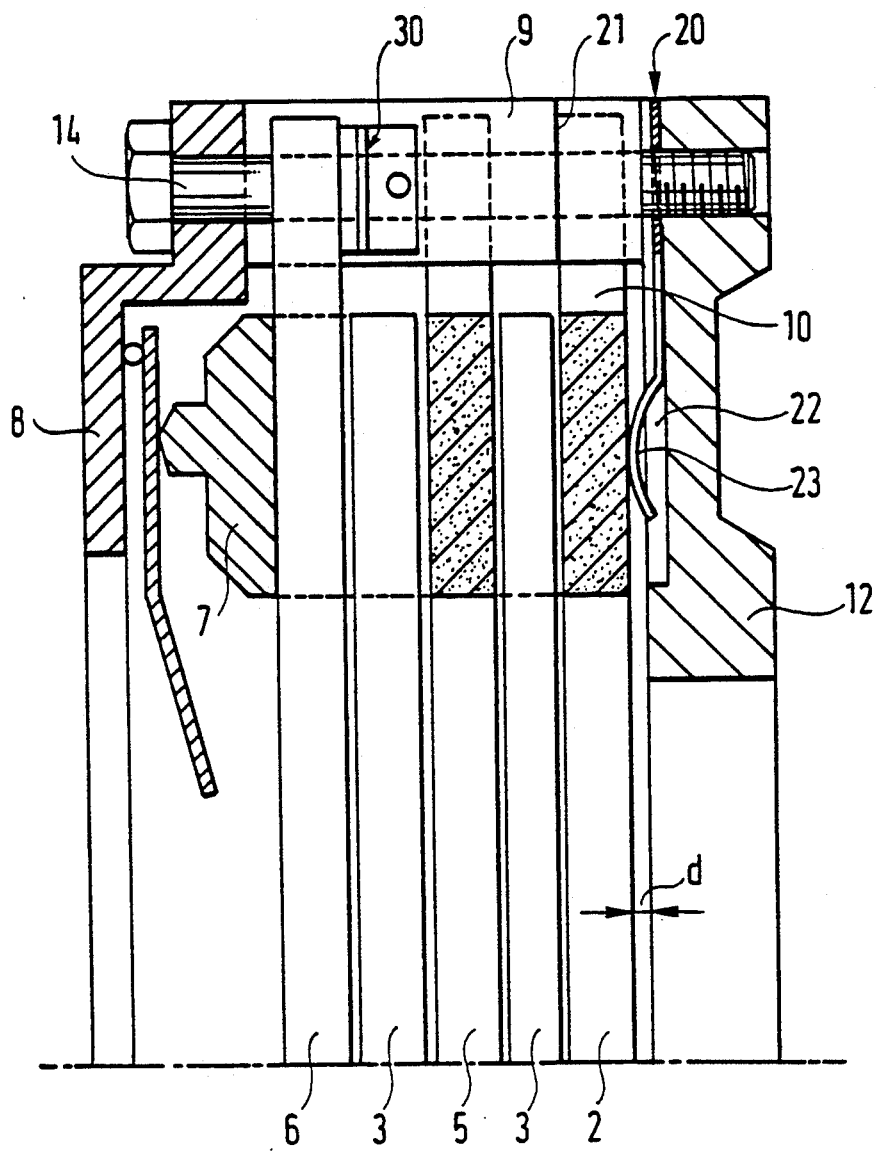
FIGS. 3 and 4 are half sections of such a clutch in the disengaged and engaged positions.
Figure 4:
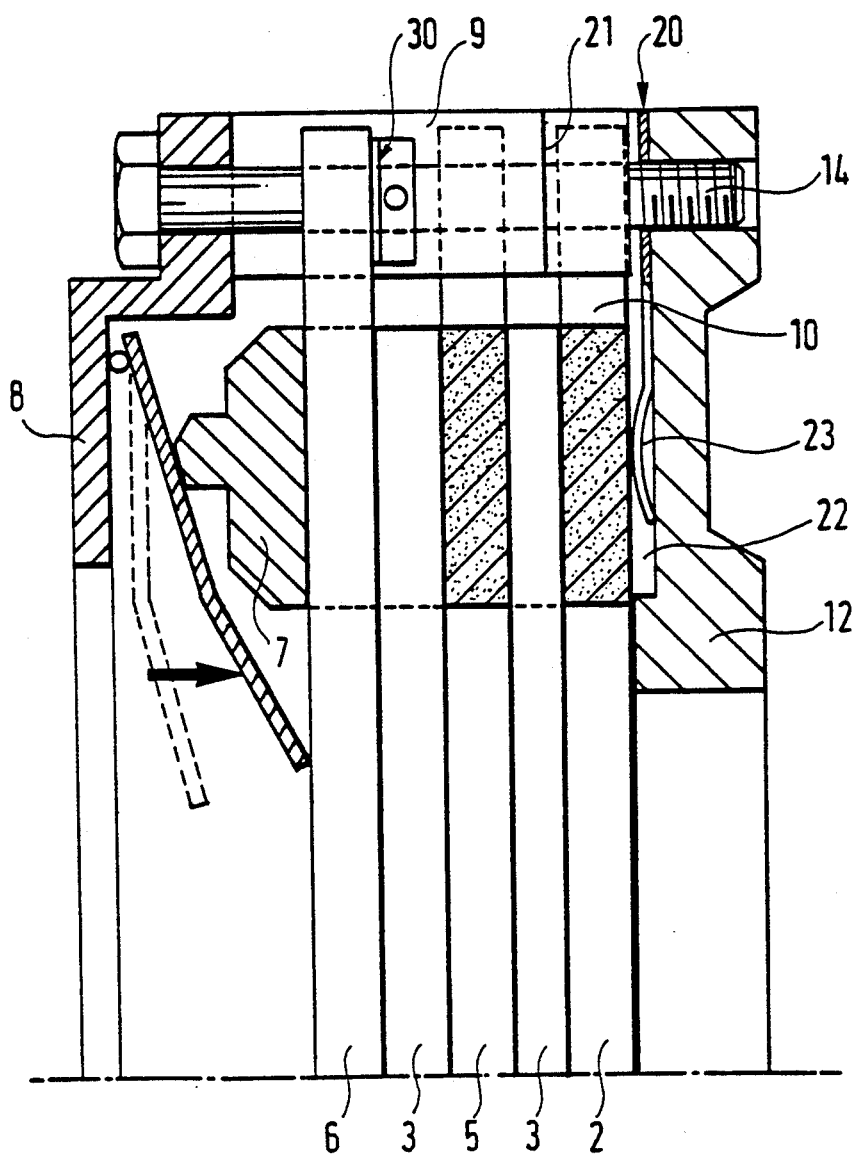

A first variant is shown in FIGS. 2, 3 and 4. In FIG. 2 only the driving plates 2, 5, 6 and one bar 9 are shown for clarity.

A device called a progressive device 20 is formed by a resilient metal tongue, whose active end is curved and is applied to the first driving plate 2 and whose attachment end is located on the end on the flywheel side of the bar 9 and has a hole receiving the screw 14 connecting the casing 8 to the flywheel 12. At this end the bar 9 is of reduced width, in order to form two abutment shoulders 21, and the recess 10 of the first driving plate 2 is also narrower than the recesses of the other plates 5, 6, in order that it may abut the shoulders 21. A radial groove 22 is associated with this tongue 20, being formed in the inner face of the flywheel 12 and receiving the tongue 20.

A device called a packing-up device 30 is formed by two resilient metal tongues located on the two sides of the bar 9. The attachment end of each tongue is riveted to the side face of the bar 9, between the second driving plate 6 and the next adjacent driving plate 5, and its active end is bent through about 90° relative to the attachment end, so as to press the second plate 6 against the plate 7.

In the disengaged position (FIG. 3), the play is distributed uniformly over the interfaces of the driving plates 2, 5, 6 and the driven plates 3. The play at the flywheel 12 to first plate 2 non-clutching interface, called the "progressive" stroke d is defined by the position of the shoulders 21, when the first plate 2 is pressed against these by the tongue 20. The play of the plate 7 to second plate 6 interface is nil when the latter is pressed against the plate 7 by the tongues 30.

In the engaged position (FIG. 4), the operative end of the tongue 20 is compressed in the groove 22 and retracts to allow the play at all the interfaces to be removed.

By virtue of the device 20, progressive compression of the plates, and hence a non-abrupt engagement, are thus obtained. The progressive stroke is controlled by the position of the abutment means 21.

By virtue of the device 30, the distribution of the play is maximized at the active, clutching interfaces and better release results on disengagement. Moreover, the compression or engagement occurs in a perfectly uniform manner, without interfering action in the region of the flywheel to first driving plate non-clutching interface and the thrust plate to second driving plate non-clutching interface.

Figure 5:
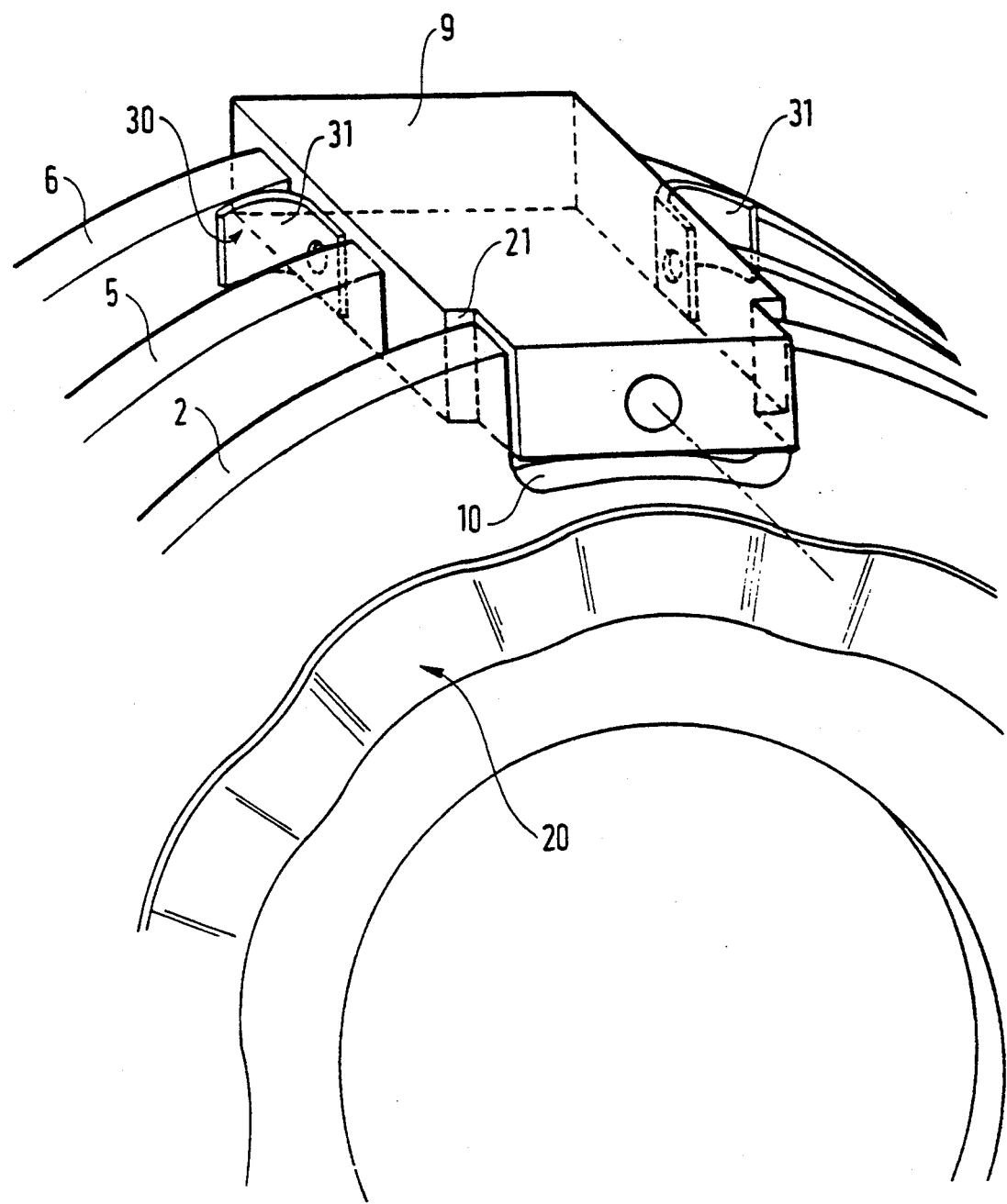
FIG. 5 is a partial perspective view of a second embodiment of a clutch in accordance with the invention.
Figure 6:
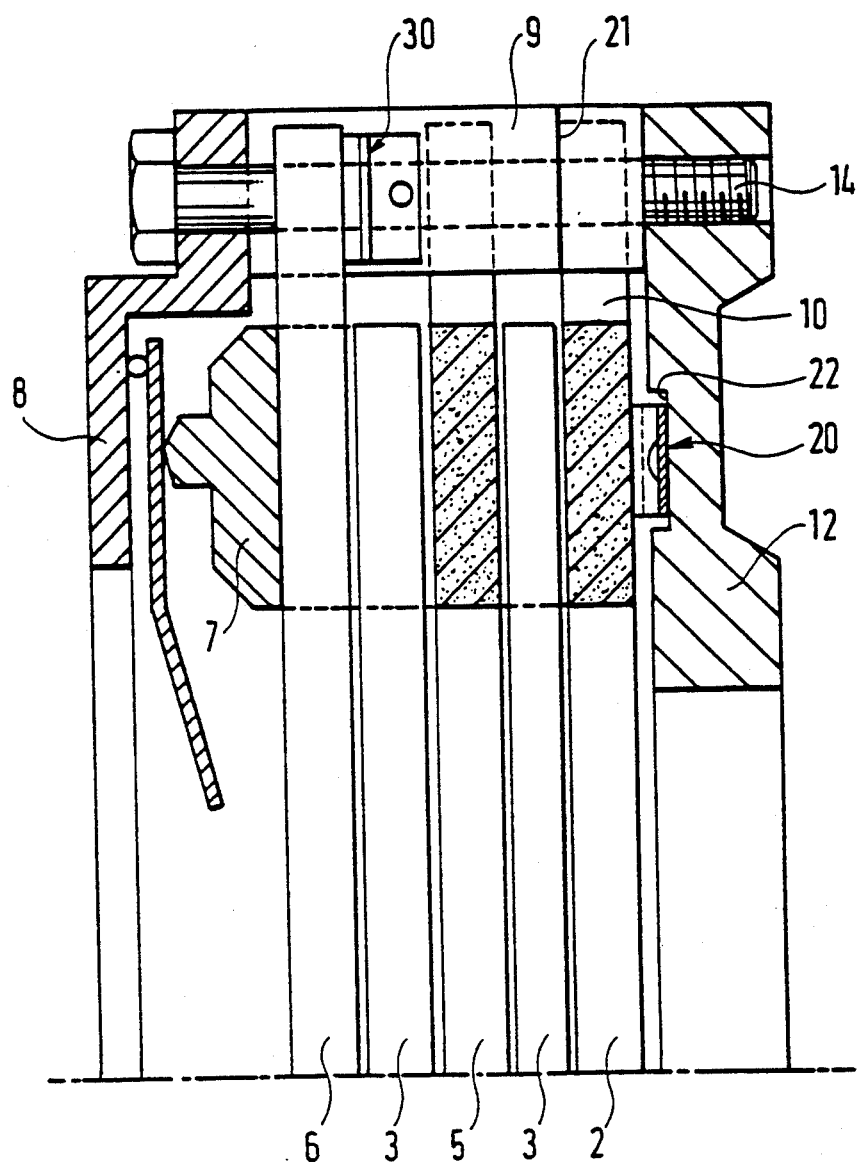
FIG. 6 is half section of such a clutch in the disengaged position.

A second embodiment is shown in FIGS. 5 and 6.

The packing-up device 30 is identical.

The progressive device 20 is a corrugated ring, preferably of metal, fitted in a circular groove 22 recessed into the flywheel 12 and thus located between the latter and the first plate 2. This ring could be retained by riveting to the plate 2 or to the flywheel 12.

In the clutch disengaged position (FIG. 6), it ensures there is the progressive stroke d by pressure on the plate 2 and in the clutch engaged position it is retracted into the groove 22.

Figure 7:
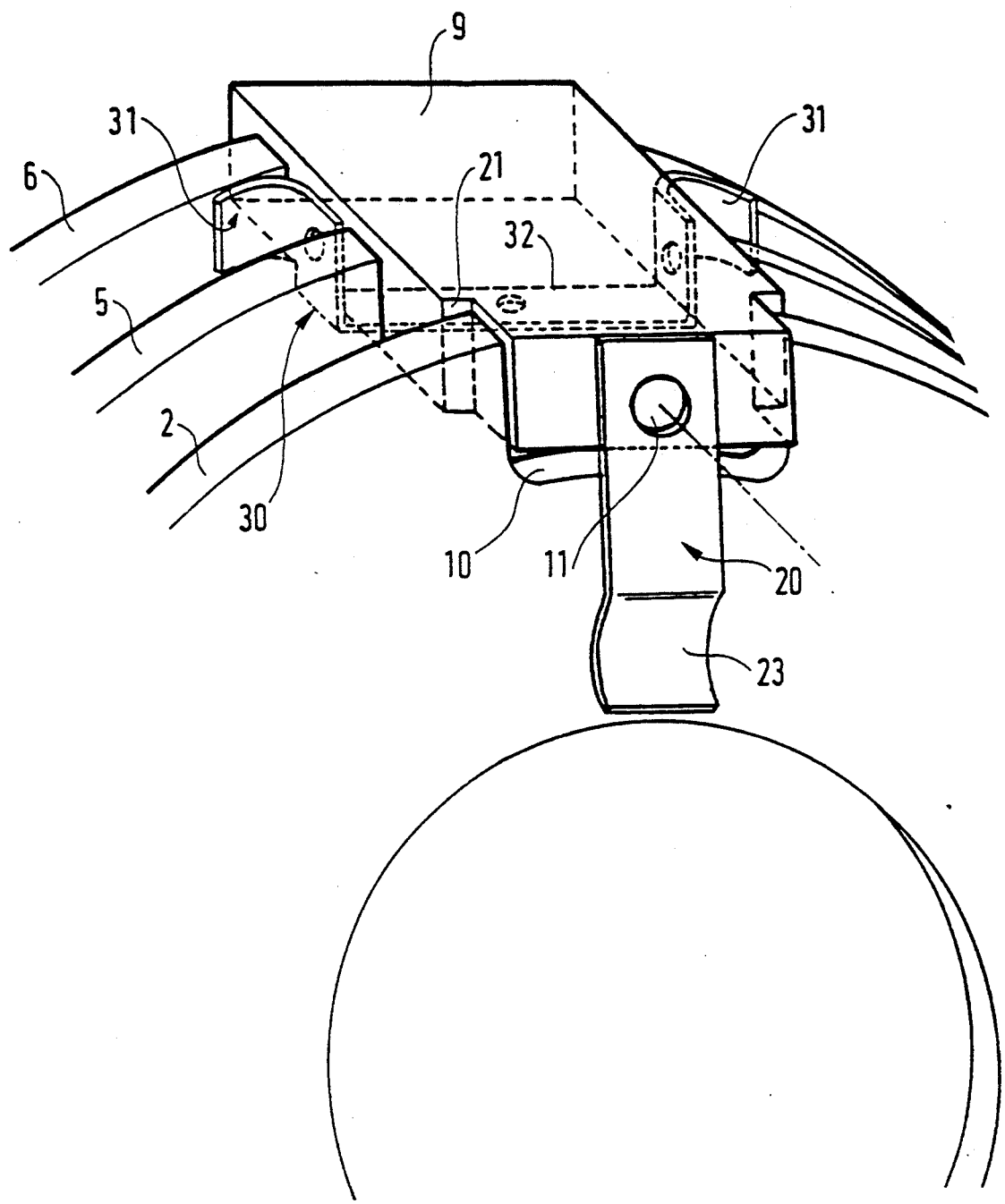
FIG. 7 is a partial perspective view of a third embodiment of a clutch in accordance with the invention.

A third variant is shown in FIG. 7.

The progressive device 20 is identical with that of the first variant.

The packing-up device 30 is here formed by a single bent part, the two resilient tongues 31 being connected by a central strip 32 forming a U with the flat parts of the tongues 31 located against the side faces of the bar 9. The strip 32 is located against the inner face of the bar 9 and is riveted thereto.

The variants illustrated in FIGS. 8 to 11 have progressive devices and packing-up devices in one piece.

Figure 8:
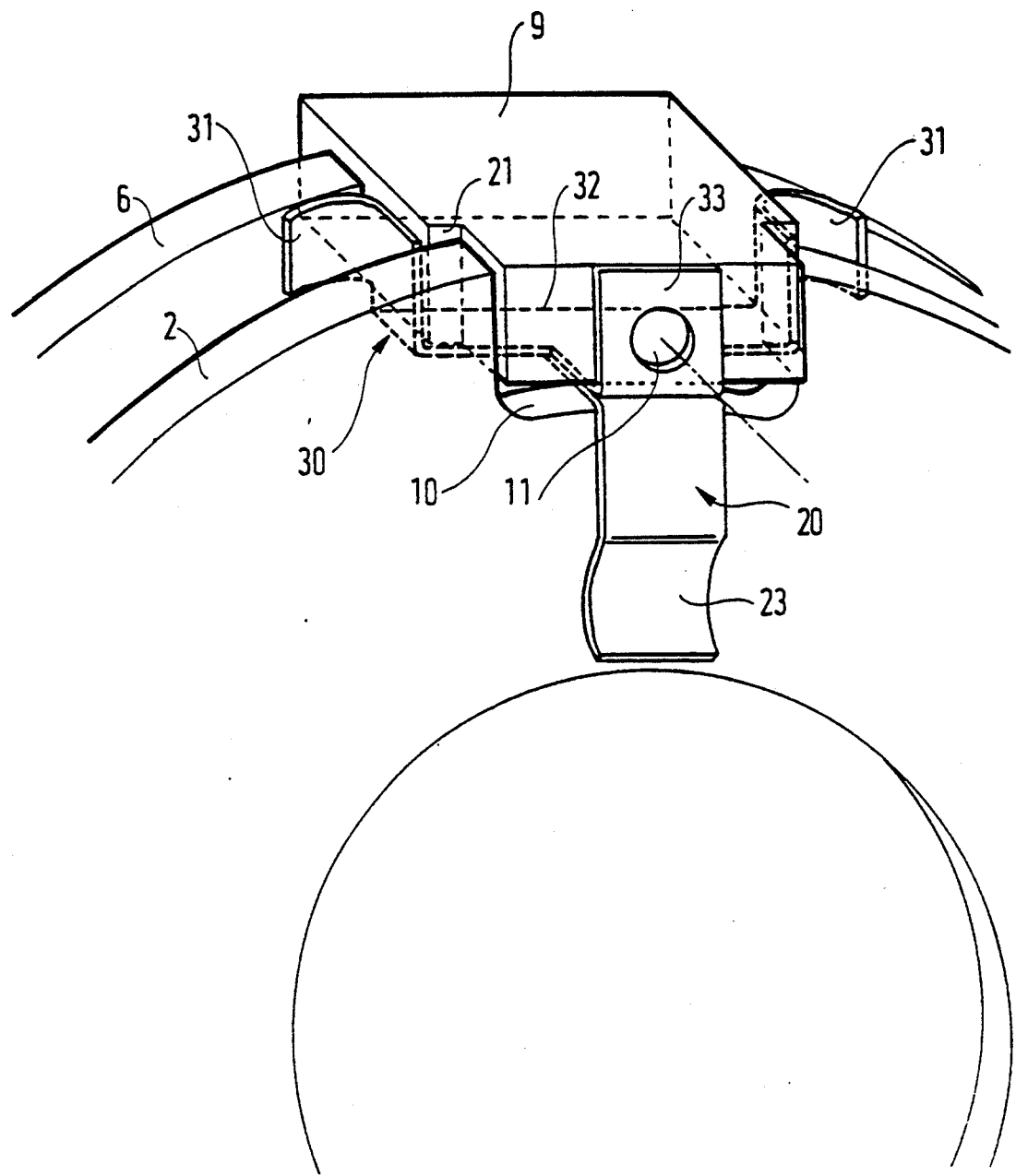
FIG. 8 is a partial perspective view of a fourth embodiment for a clutch in accordance with the invention with a single driven plate.

In FIG. 8 they are of the nature of resilient tongues 23, 31, the progressive device being formed by a radially aligned tongue 23 and the packing-up device including two tongues 31 connected by a central strip 32. This central strip 32 is extended by a perpendicular fixing tongue 33 bent through a right angle so as to be located against the end face of the bar 9, where it is provided with a hole receiving the screw 14 fixing the bar 9 to the flywheel 12. The non-operative end of the tongue 23 is bent through a right angle to lie between the plate 2 and the bar 9, where it is welded to the tongue 33 so as to form a single piece.

Figure 9:
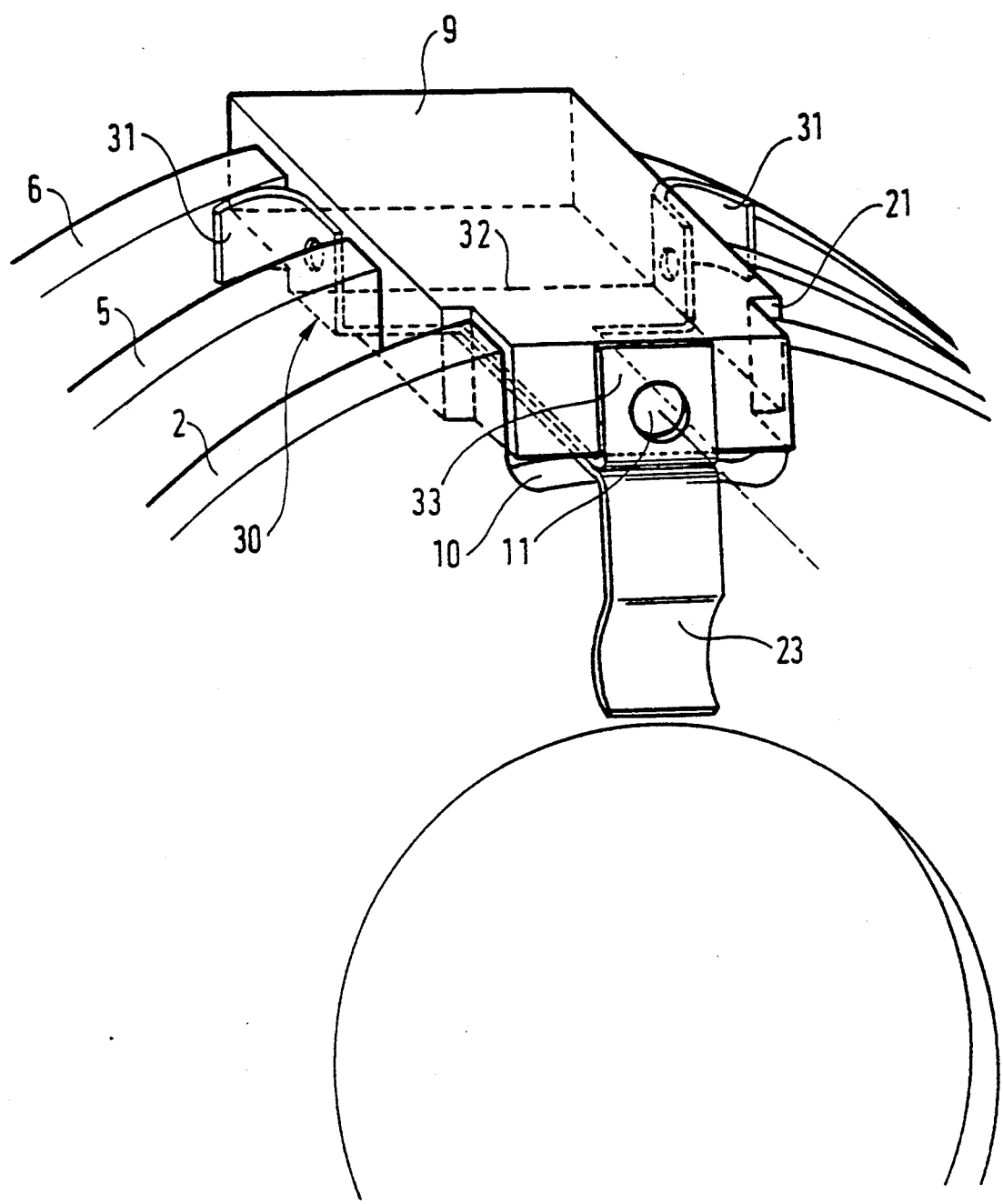
FIG. 9 is a partial perspective of the same embodiment for a clutch in accordance with the invention with two driven plates.

FIG. 8 shows a clutch with a single driven plate, called a "single-plate" clutch. FIG. 9 shows a clutch with two driven plates with the same arrangement of tongues, which is adapted to any multi-plate clutch by selecting the length of the tongue 33.

Figure 10:
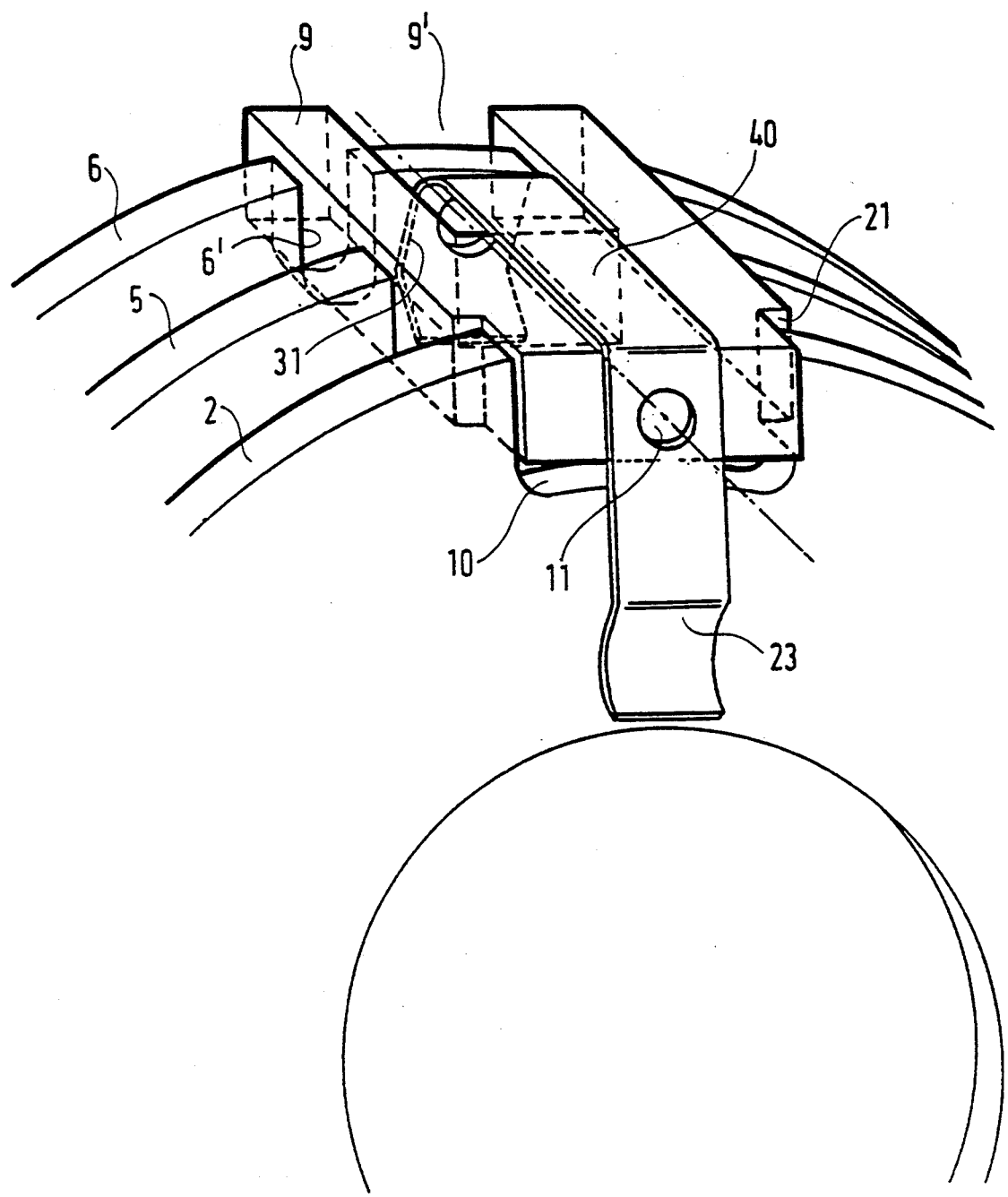
FIG. 10 is a partial perspective view of a fifth embodiment of a clutch in accordance with the invention.
Figure 11:
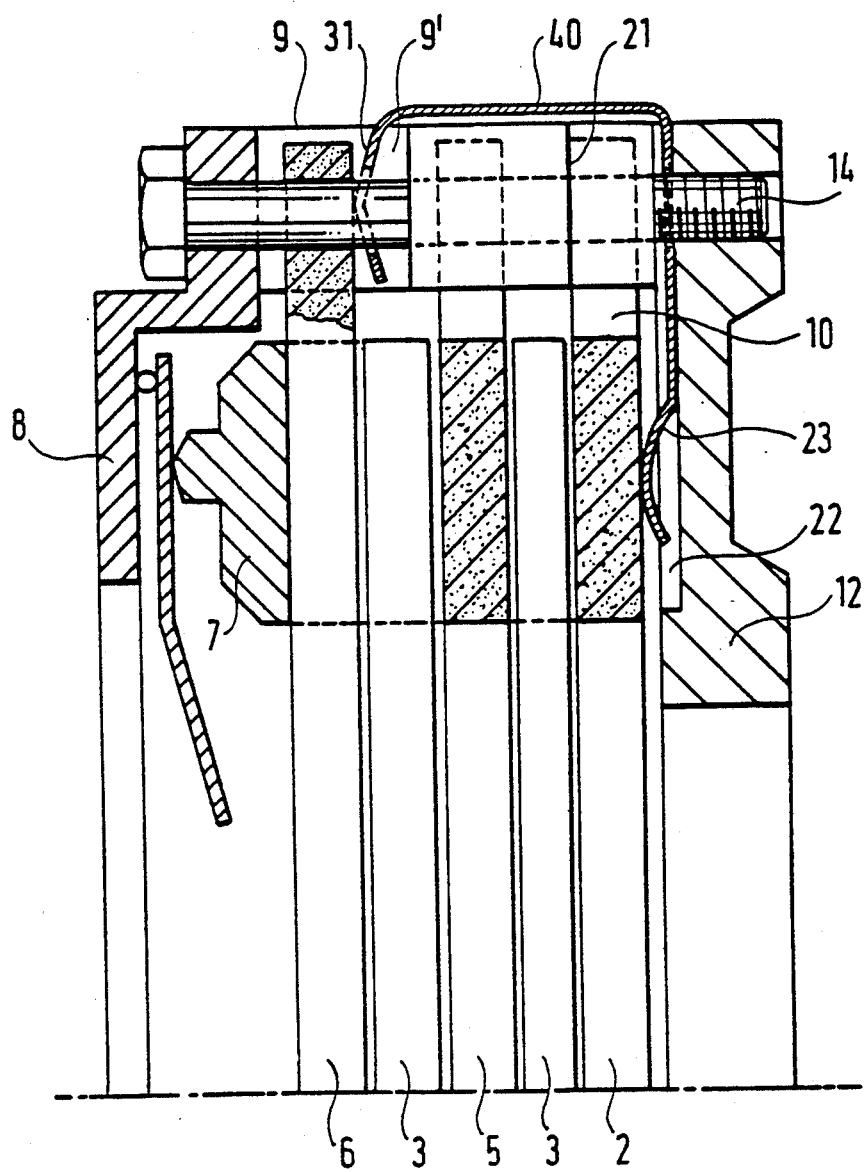
FIG. 11 is a half section of such a clutch in the disengaged position.

The variant shown in FIGS. 10 and 11 requires a special arrangement of the bar 9 and of the second driving plate 6.

The bar 9 has to be a part separate from and fixed to the casing. It is U-shaped an has an opening 9' on the casing side.

The second driving plate 6 has two recesses 6' of smaller size in place of the conventional single recess, to receive the limbs of the U-shaped bar 9. A receiving hole for the screw 14 is provided between the two recesses 6'.

The progressive and packing-up devices are formed by a single bent plate including a first radial progressive part 23 in the form of a resilient tongue like that described above, a second perpendicular part 40 located against the outer face of the bar 9 and a third packing-up part 31 forming a bent resilient tongue pressing the second driving plate 6 by the part of the tongue located between the recesses 6' and provided with a hole for the screw 14 to pass.

Adaptation of this variant to any multi-plate clutch is effected by selecting the length of the tongue part 40.

The devices described above may be fitted to all or not all of the bars 9 of the clutch. The stiffness of the progressive action can thus be controlled by fitting more or less of the progressive tongues. The packing-up tongues should for their part be adequate to remove any play between the thrust plate and the second plate.

Although the described systems all include a progressive device associated with a packing-up device, they have their own functions and only the one or only the other may be fitted to the clutch.

Further, although in the described examples, the progressive device is fitted in the flywheel to first driving plate non-clutching interface and the packing-up device in the thrust plate to second driving plate non-clutching interface, this preferred arrangement can be reversed.

Thus the packing-up device 30 shown in FIGS. 2 to 7 may be fitted between the driving plate 6 and the thrust plate 7 and/or between the driving plate 2 and the flywheel 12. (In the latter case the progressive device 20 as shown must be omitted).

It is the same with the progressive device 20 shown in the figures. When the device 20 is fitted on the side of the thrust plate 7, it is the plate 7 which has the associated groove 22. In the case of FIGS. 2, 3, 4 and 7, the bar 9 is separate from the casing 8 and is fixed thereto with the fixing part of the tongue 20 interposed, located against the end of the bar 9 on the casing side.

In the variants shown in FIGS. 8 to 11, the positions of the individual parts can likewise be reversed in like manner. In the case of a reversed arrangement, the bar 9 retains its U-shape but is likewise reversed and it is the first driving plate 2 which has two small recesses.

In the example of FIGS. 10 and 11, the tongue 23 may also be omitted, the device thus only including a packing-up device 30 fixed to the bar 9.

I claim:

1. In a clutch with structural plates of carbon-carbon, comprising:
    a drive flywheel,
    a first driving plate forming with the flywheel a first non-clutching interface,
    at least one pair of driven plates connected to an output shaft, a next adjacent driving plate being interposed between each pair of driven plates,
    a second driving plate,
    a thrust plate forming with the second driving plate, a second non-clutching interface,
    a casing with a mechanism operable to apply pressure to the thrust plate and provided with a plurality of bars fitted into respective radial recesses of the driving plates and being fixed to the flywheel,
    the improvement wherein said clutch further includes
    a packing-up device eliminating play at at least one of the non-clutching interfaces and comprising means pressing the second driving plate against said thrust plate, and wherein the packing-up device further comprises at least one resilient metal tongue located between the second driving plate and a next adjacent driving plate, and said at least one resilient metal tongue having an operative curved end pressing the second driving plate against said thrust plate.

2. A clutch according to claim 1, wherein the packing-up device comprises two resilient tongues having attachment ends located against opposite side faces of respective ones of said bars.

3. A clutch according to claim 2, wherein the two resilient tongues are connected by a central strip located against an inner face of the respective ones of said bars.

4. A clutch according to claim 1, wherein the bars are U-shaped with a pair of limbs defining an opening facing the thrust plate, and the second driving plate having two recesses receiving the limbs of a respective one of said bars and the resilient tongue being located in the opening and pressing against the second driving plate between the recesses.

5. A clutch according to claim 4, wherein the resilient metal tongue is extended by a tongue part located against an outer face of the ones of the bars and being provided with a hole receiving means attaching the casing to the flywheel.

* * * * *